(No Model.) 3 Sheets—Sheet 2.
F. H. VAN HOUTEN.
DOUGH DIVIDER.
No. 540,602. Patented June 4, 1895.
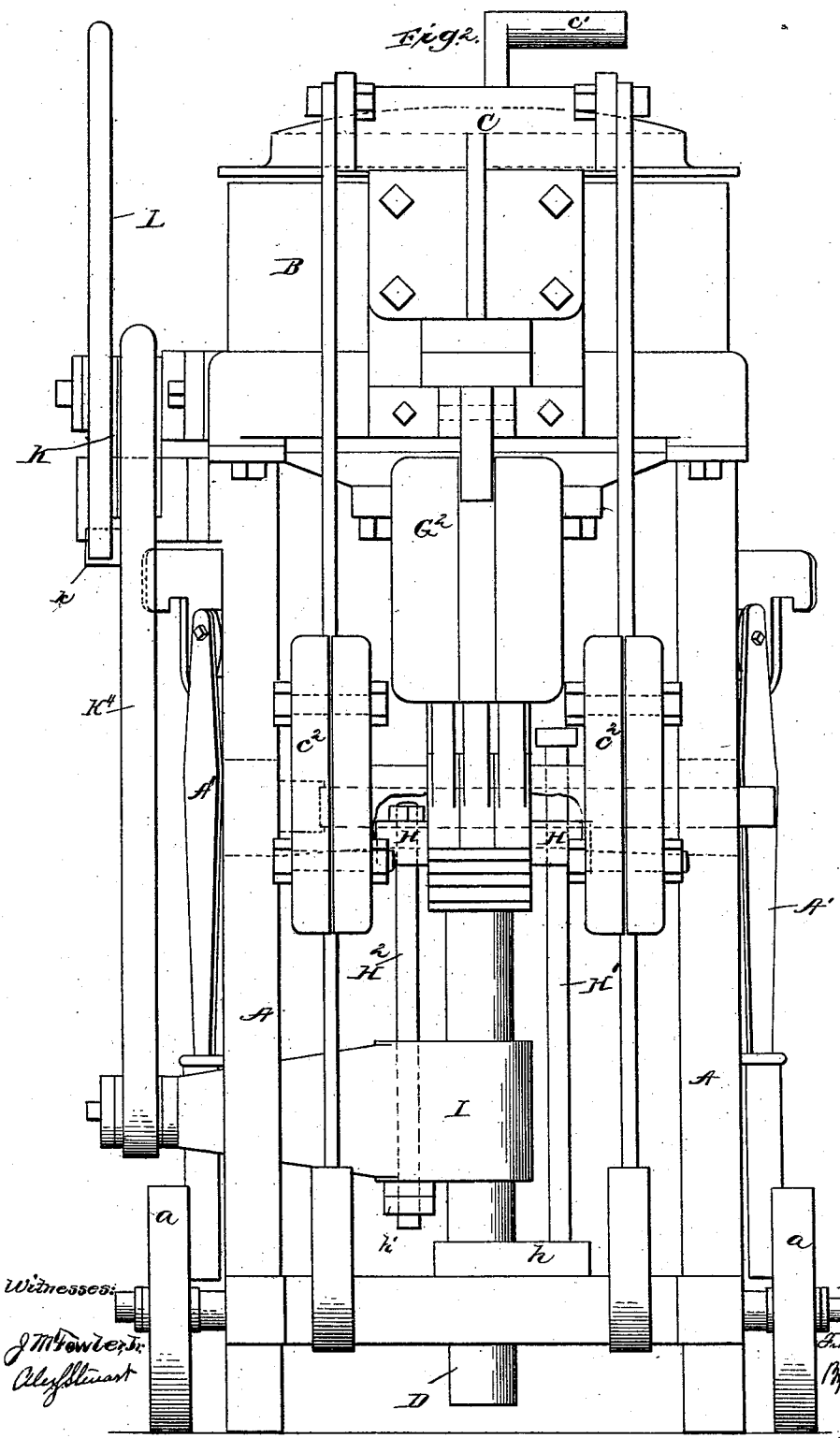
Witnesses:
J. M. Fowler, Jr.
Alex Stuart
Inventor:
Frank H. Van Houten
By Church & Church
his Attorneys

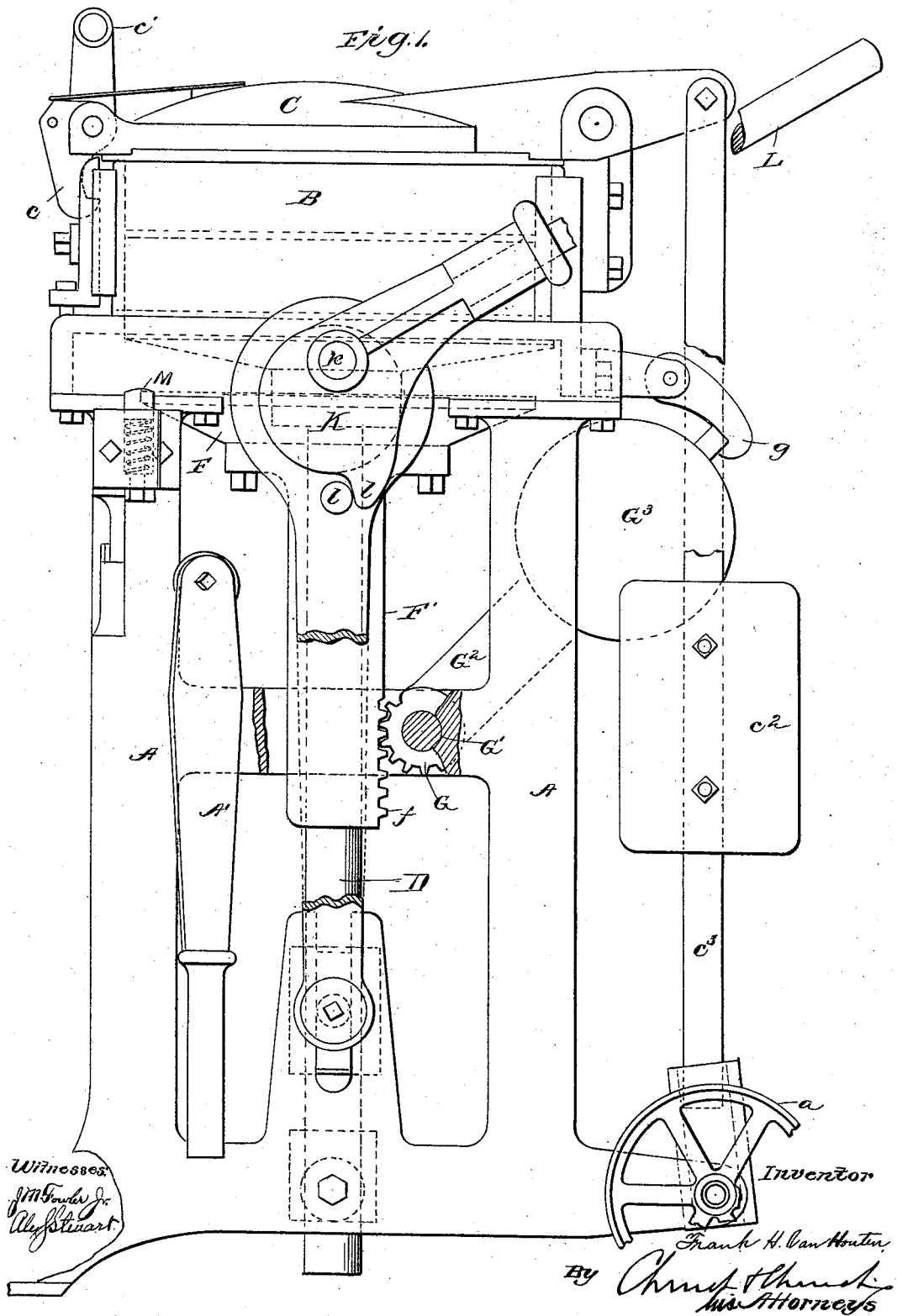

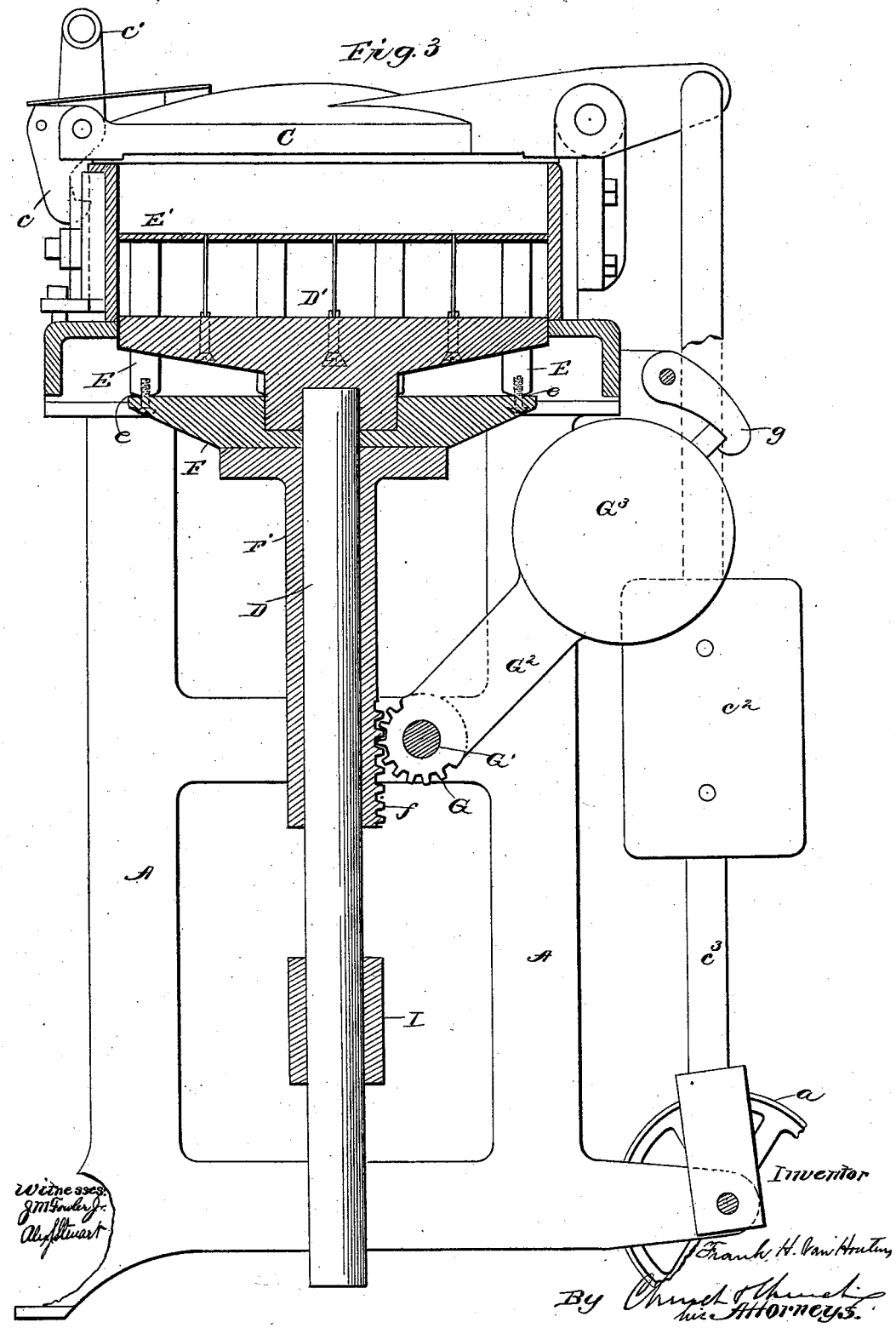

UNITED STATES PATENT OFFICE.

FRANK H. VAN HOUTEN, OF FISHKILL-ON-THE-HUDSON, NEW YORK.

DOUGH-DIVIDER.

SPECIFICATION forming part of Letters Patent No. 540,602, dated June 4, 1895.

Application filed August 23, 1894. Serial No. 521,122. (No model.)

*To all whom it may concern:*

Be it known that I, FRANK H. VAN HOUTEN, of Fishkill-on-the-Hudson, in the county of Dutchess and State of New York, have invented certain new and useful Improvements in Dough-Dividers; and I do hereby declare the following to be a full, clear, and exact description of the same, reference being had to the accompanying drawings, forming a part of this specification, and to the letters of reference marked thereon.

This invention relates to improvements in machines for dividing a mass of dough into equal portions for a batch of rolls or loaves, the machine being of that class set forth in my Patent No. 524,363, dated August 15, 1894, the objects of the invention being to simplify the mechanism employed and secure the pressing and dividing of the dough by the operation of a single hand lever.

The invention consists in certain novel details of construction and combinations and arrangements of parts all as will be now described and pointed out particularly in the appended claims.

Referring to the accompanying drawings, Figure 1 is a side elevation of a machine embodying my present invention with portions broken away to expose underlying parts. Fig. 2 is a rear elevation of the same. Fig. 3 is a vertical section taken from side to side of the machine.

Like letters of reference in the several figures denote the same parts.

The framing of the machine lettered A may be of any desired character, preferably capable, however, of being mounted on casters $a$ at the rear and is provided with pivoted handles A' by means of which the machine may be trundled about the bakery.

At the top of the framing A is a cylinder B, secured by bolts or otherwise and a cover C, hinged at the rear side, closes the top of the cylinder. A suitable spring pressed catch $c$ holds the cover closed, and a releasing handle $c'$ and counterweights $c^2$ hung on rods $c^3$ in rear of the cover, are provided for opening the cover all as fully set forth in my said patent. Guided in suitable bearings centrally below the cylinder is a vertical shaft D having upon its upper end the knife base D' carrying the knives, said base being perforated or formed with openings in the bottom of each compartment for the passage of stems E carrying upon their upper ends the facets E' which constitute the movable presser face.

Considerable difficulty has been heretofore experienced in fitting the facets accurately in the knife compartments, it being almost impossible to fit the same sufficiently accurate to prevent dough squeezing through and at the same time, have all of the facets mounted rigidly on the base without binding at some one or more points. These difficulties I have effectually overcome and at the same time reduced the cost of such extremely accurate work by allowing the facets to be guided by the knives connecting them to their support, or as heretofore termed the compressor head base, by a loose connection which will allow them sufficient lateral movement to follow any slight irregularities in the knives or distortion of the same which is certain to be present to a greater or less degree. The connection is preferably made by simply rounding off the lower end of the stem as at $e$ Fig. 3, and connecting the same at a central point to the compressor head base F by a screw left loose enough to allow of the necessary lateral movement of the facet.

The compressor head base is mounted on a vertical sleeve or tubular support F' surrounding the vertical shaft D and having near the bottom on the rear side a series of teeth or a rack $f$. With this rack meshes a gear segment or segments G formed integral with or rigidly attached to an arm or arms $G^2$ carrying at their outer ends a weight or weights $G^3$. The weight or weights $G^3$ being pivoted on the shaft G' tend to hold the compressor head up, save when themselves held by the catch $g$ or the operating lever as will be presently explained. On each side of the tubular support, I provide lugs H, through which pass tie bolts H' $H^2$, the head of the bolt H' extending up beyond the lug H, as shown in Fig. 2, out of contact therewith when the sleeve is turned down. This bolt H' extends downward and is secured rigidly in any suitable manner to a block $h$, the bolt $H^2$ being passed loosely through a laterally projecting bracket or arm I on said shaft. Now when the sleeve is lifted by the weights $G^2$, the upward movement will be arrested by lug H coming in contact with head of bolt H′, the other bolt H² serving to draw the sleeve down, both the bolts passing loosely through the lugs H, H, or bracket I, nuts h′ being provided for adjustment.

The parts are so adjusted that with the compressor head and knives both down, the weights will be raised, and it is obvious that if a batch of dough be placed in the cylinder with them in this position, the cover closed and the central shaft raised, the weights will descend moving the compressor up distributing the dough with a uniform pressure and, as the resistance offered by the dough to the advance of the compressor increases the movement of the said compressor, its tubular support and weights will be arrested, without however, relieving the dough from pressure, and the vertical shaft D and knives continuing their movement will divide the dough into sections. A reverse or downward movement of the shaft will first retract the knives and then through the tie bolts draw the compressor head down and elevate the weights ready for another operation, although in practice it may be found convenient after the knives have been manipulated, to open the cover and allow the weights to force the divided batch up out of the cylinder.

Besides giving a uniform compression to all the batches of dough, this construction enables me to effect all the operations by simply moving the central shaft and I prefer a power mechanism for effecting this movement, consisting of a cam K journaled on a stud k at the top of the frame with a connecting rod and strap K⁴ uniting the cam and bracket I. A hand lever L is rigidly connected with the cam, and set at such an angle therewith, that when the handle is thrown back and the stop projections l l brought in contact as in Fig. 1, the cam will be slightly beyond the center and any upward pressure on the connecting rod will tend to hold the parts in this position. When the handle is brought forward, the cam is turned and the central shaft raised as before explained until the lever strikes the spring stop M in which position the knives are not quite against the under surface of the cylinder cover. A slight additional pressure on the lever will however overcome the resistance of the spring stop and cause the knives to cut way through, but the knives will be again slightly lowered when the increased pressure on the lever is removed. The advantage of this construction is that it prevents all possibility of the cover being brought down on the cutting edges of the knives, should they inadvertently be left advanced either in cleaning the machine, or when operating it. This is a feature of considerable moment, for should the cover crush down on the knives, it would by reason of its weight and leverage destroy the cutting edges if not the whole knife structure.

When the machine is not in use or when being transported it is preferred to secure the weights in their elevated position by means of the catch g before mentioned.

The operation of the machine is extremely simple for after the dough is in place and the cover of the cylinder closed, it is only necessary to draw the single operating lever forward to compress and distribute the dough and separate into sections of the desired size. The dough being subjected in every instance to an equal degree of pressure insures a production of uniform batches of rolls in every instance.

Having thus described my invention, what I claim as new is—

1. In a dough divider, the combination with the dough receptacle and independently movable dividing knives and compressor working therein, of the weight connected with the compressor for advancing it, a power mechanism for advancing the knives and a loose connection controlled thereby for restraining the advance of the compressor and returning it to retracted position as the knives are retracted; substantially as described.

2. In a dough divider, the combination with the dough receptacle, and the automatically advanced compressor working therein, of the knives working through the compressor a manually controlled knife operating mechanism and a loose connection between the same and compressor for returning the latter to normal position and allowing it to advance in unison with the knives, until arrested by the resistance of the dough; substantially as described.

3. In a dough divider, the combination with the dough receptacle, the vertically movable compressor working therein, having the downwardly extending stem, the weight and connections between the weight and stem for elevating the compressor, of the knives working in the receptacle a manually controlled power mechanism for operating the knives and an interposed loose connection for retracting the compressor and weight while permitting of an independent forward movement of the knives; substantially as described.

4. In a dough divider, the combination with the dough receptacle, the vertically movable compressor working therein and having the downwardly extending stem, the weight and connections between the weight and stem for advancing the compressor, of the knives, the vertical shaft connected therewith, a loose connection between the shaft and stem for returning the compressor to retracted position while permitting the shaft to advance independently thereof, and a manually controlled operating mechanism for the shaft; substantially as described.

5. In a dough divider, the combination with the dough receptacle, the compressor working therein, the downwardly extending stem having the rack at the lower end and the pivoted weight having the segment in mesh with the rack, of the knives having the vertical shaft, a loose connection between the shaft and stem for returning the compressor to retracted position, while permitting the shaft to advance independently thereof the cam for advancing the shaft and the hand lever for moving the cam; substantially as described.

6. In a dough divider, the combination with the receptacle for dough, the compressor working therein, the downwardly extending tubular stem supporting the compressor and having the rack at the lower end, the weights and the pivoted segment supporting the same in mesh with the rack, of the knives, the shaft supporting the same passing down through the tubular stem, a loose connection between the stem and shaft, an operating cam for elevating the shaft and a hand lever for turning the cam; substantially as described.

7. In a dough divider, the combination with the receptacle for dough, the compressor working therein, the weights for elevating the compressor and the catch for holding said weights elevated, of the knives working through the compressor, the knife supporting shaft a loose connection between the knife supporting shaft and compressor, whereby the latter is retracted, and an operating cam and lever for advancing the shaft; substantially as described.

8. In a dough divider, the combination with the receptacle, the hinged cover therefor, the knives reciprocating in the receptacle and a manually controlled power mechanism for operating the knives, of a spring stop located in position to arrest the advance of the knives below the level of the cover, whereby injury to the knives is prevented; substantially as described.

9. In a dough divider, the combination with the receptacle, the hinged cover therefor, the compressor and the knives reciprocating in the receptacle, of a power mechanism for advancing the knives embodying a hand lever, and a yielding stop located in the path of said lever and operating to hold the knives below the level of the cover, but capable of being overcome by the application of a slight increase of power to bring the knives against the cover and complete the severance of the dough, substantially as described.

10. In a dough divider, the combination with the dough receptacle and the knives working therein, of the compressor head base, the compressor facets working between the knives, and the stems on which said facets are supported loosely connected with the compressor head base; substantially as described.

11. In a dough divider, the combination with the dough receptacle and knife base and knives working therein, of the compressor head base, the compressor facets working between the knives, the stems carrying said facets passing through the knife base and having their lower ends rounded and screws connecting said stems and compressor head base, whereby the facets are allowed a slight lateral movement; substantially as described.

FRANK H. VAN HOUTEN.

Witnesses:
EDGAR G. GREENE,
J. E. VAN HOUTEN.